United States Patent
Gersch et al.

[15] 3,640,633
[45] Feb. 8, 1972

[54] ADJUSTABLE BORING QUILL ASSEMBLY

[72] Inventors: Richard C. Gersch, 27401 Red Leaf Lane, Southfield, Mich. 48075; Roland Bruce Reynolds, 1628 Haynes, Birmingham, Mich. 48008

[22] Filed: Aug. 28, 1969

[21] Appl. No.: 853,696

[52] U.S. Cl. .............................. 408/12, 408/150
[51] Int. Cl. ................................. B23b 47/22
[58] Field of Search .............. 77/3, 58.34, 4, 3 TR, 34.5; 90/15.2; 82/14 D; 408/12, 150

[56] References Cited

UNITED STATES PATENTS

| | | | |
|---|---|---|---|
| 3,259,002 | 7/1966 | Huff et al. | 77/34.5 X |
| 3,254,548 | 6/1966 | Gersch | 77/58.34 |
| 2,820,376 | 1/1958 | Jannenga et al. | 77/58.34 |

*Primary Examiner*—Francis S. Husar
*Attorney*—Hauke, Gifford and Patalidis

[57] ABSTRACT

An automatically adjustable boring and turning quill assembly for a boring machine and including an adjustable eccentric sleeve member for moving or turning the boring bar radially toward and away from the workpiece and a piston which upon axial movement produces adjustment of the sleeve member. Fine adjustment to compensate for wear of the boring bar is provided by a stepping motor which actuates an adjustable stop for the piston.

10 Claims, 5 Drawing Figures

PATENTED FEB 8 1972

3,640,633

INVENTORS
RICHARD C. GERSCH
R. BRUCE REYNOLDS
BY Hauke, Gifford & Patalidis
ATTORNEYS

ADJUSTABLE BORING QUILL ASSEMBLY

BACKGROUND OF THE INVENTION

1. Field of the Invention

The present invention relates to boring quills adapted for machining internal and external diameters and more particularly to means for automatically adjusting the quills to compensate for cutting tool wear.

II. Description of the Prior Art

Boring quills having an eccentric sleeve and a cylinder for actuating the sleeve to provide for adjustment of the boring bar have been previously disclosed. U.S. Pat. No. 3,254,548 issued to one of the inventors herein discloses such an assembly in which a drive spindle has an adjustable boring quill attached to one end. A reciprocable shaft extends through the spindle and is connected to the boring bar through an eccentric sleeve member such that linear movement of the spindle produces rotation of the sleeve member to radially adjust the boring bar. An air cylinder is connected with the shaft and moves the shaft to produce the adjustment so that adjustment is automatic and is accomplished while the machine is operating.

While the boring quill disclosed in the aforementioned patent has been generally satisfactory it has not satisfied the need for such an assembly in which small accurate adjustments are necessary. Movement of the cutting tool depends solely upon differential air pressure across the piston and it is impossible to accurately translate tool wear into movement of the piston until the tool wear has reached proportions which in many operations are not acceptable.

SUMMARY OF THE INVENTION

The present invention is similar to the invention of the aforementioned patent except that means have been provided to compensate for even very small increments of tool wear. The apparatus includes a rotatable spindle having an adjustable boring quill attached to one end. The boring quill is provided with an intermediate eccentric sleeve rotatable between a pair of preloaded ball bushings which support the boring bar. The eccentric sleeve member is provided with a pair of tongue members which engage sockets provided at the front end of a rotatable member supported within the spindle and which is threaded by means of helical splines or the like to the end of a shaft extending axially through the spindle and rotatable therewith.

The other end of the shaft extends outwardly of the spindle and is connected by means of a coupling to the end of the piston rod of a fluid cylinder so that linear movement of the piston rod causes radial extension and retraction of the boring bar toward and away from the workpiece.

To provide for fine adjustment in the movement of the boring bar toward the workpiece and to thus provide for cutting tool wear an adjustable stop member is provided which limits movement of the piston in the direction which produces extension of the boring bar toward the workpiece. The stop member is connected to the end of a screw which is rotatable by a stepping motor. The screw is supported in a stationary nut so that actuation of the motor causes the screw to move linearly to adjust the position of the stop member.

Tool wear is sensed by gaging apparatus and the motor is automatically actuated to move the stop member to a position which will permit the piston to be moved to a position to compensate for the tool wear. Actuation of the fluid cylinder moves the piston against the stop member and causes the cutting tool to be extended into the workpiece to the new position. Retraction is accomplished by causing the piston rod to be moved in a direction away from the stop member and extension or retraction can be accomplished automatically and without interrupting operation of the boring machine.

BRIEF DESCRIPTION OF THE DRAWINGS

The accompanying drawings illustrate a preferred embodiment of the present invention in which like reference characters refer to like parts throughout the several views and in which.

DESCRIPTION OF A PREFERRED EMBODIMENT

Figure 1:
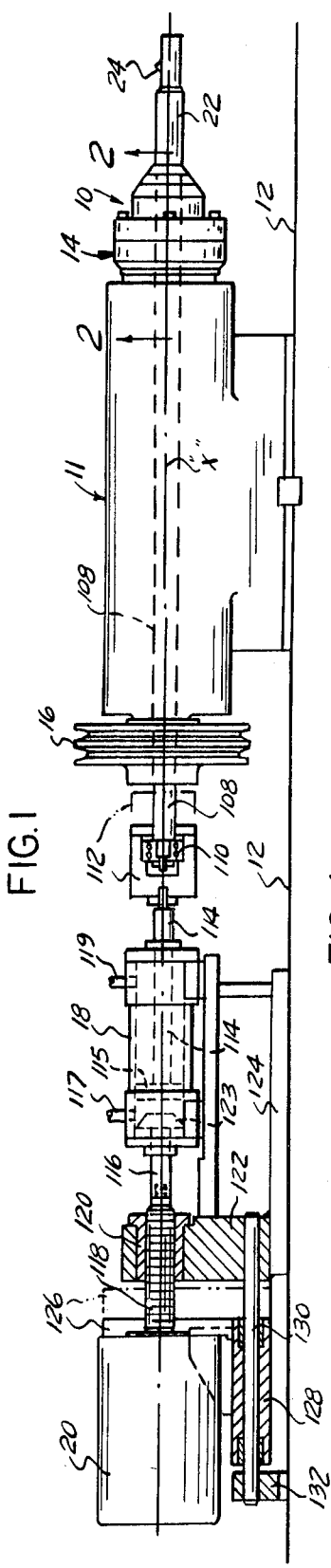
FIG. 1 is a side view of the complete boring quill, drive spindle and adjusting mechanism assembly as provided in accordance with the present invention and with portions illustrated schematically.

Now referring to the drawings for a more detailed description of the present invention, FIG. 1 illustrates a preferred boring quill assembly 10 as being mounted to a surface 12 of a boring apparatus (not shown). The assembly 10 includes a rotating work spindle 14 driven for instance by means of a pulley 16 from a source of power (not shown). The spindle 14 supported by housing 11 and is connected to a fluid cylinder 18 which in turn is connected to a motor 20.

The boring apparatus in operation preferably produces workpieces having internally machined openings. In practice, the machined openings may be constantly checked by a gaging apparatus 17 as illustrated schematically in FIG. 5 to determine if the opening is within the specified manufacturing tolerances. Preferably, the conventional gaging apparatus 17 is connected by means of a signal transmitter or the like (not shown) to a solenoid valve 19 to actuate the cylinder 18 and to the motor 20 to start the motor for rotation upon the detection of undersized, oversized or otherwise improperly formed openings in the workpiece to thereby adjust the boring quill 10 accordingly without stopping the rotation of the spindle 14, as will be described hereafter in more detail.

Referring again to FIG. 1, the boring quill assembly 10 supports a boring bar 22, which is rotatable therewith, but which is independently radially adjustable relative to the central spindle axis "X" and which carries at its end a cutting tool 24 such as a carbide tool bit which is adapted, under normal operation of the boring apparatus, to remove material from the inner surfaces of an opening in a workpiece as is known.

Figure 2:
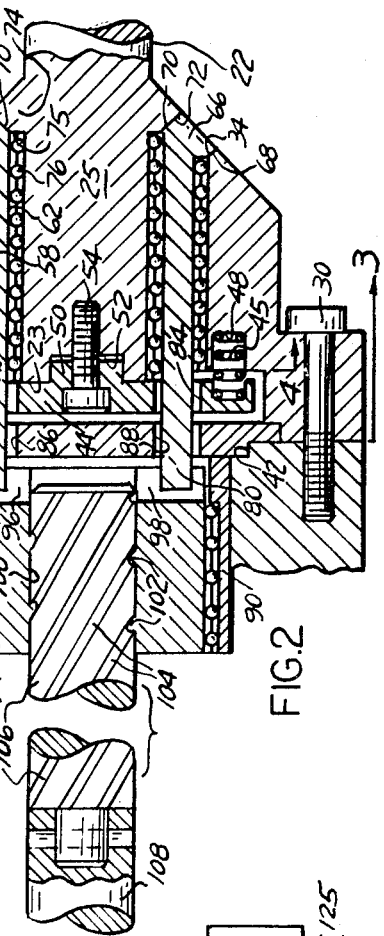
FIG. 2 is an enlarged longitudinal cross section through the boring quill and adjusting shaft assembly as seen along line 2—2 of FIG. 1.

FIG. 2 shows the boring quill 10 more in detail from which it will be noted that the boring quill comprises an outer substantially cylindrical housing 26 having a radial flange portion 28 by means of which the outer housing of the quill is adapted to be attached to the front end 15 of the spindle 14 by the use of bolts 30. The housing 26 is provided with a cylindrical bore 32 which outwardly expands into a chamfer 34. Inwardly, that is adjacent to the front end 15 of the spindle 14, the housing bore 32 is provided with a first counterbore 36 and a second counterbore 38 of smaller diameter, which intersect the cylindrical bore 32.

Figure 4:
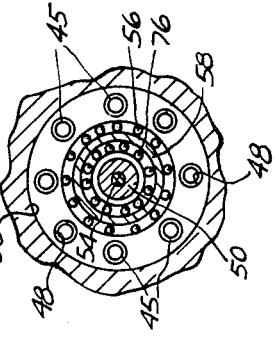
FIG. 4 is another transverse cross section of the boring quill assembly of FIG. 2 as seen along line 4—4 thereof.

The first counterbore 36, immediately adjacent the front end 15 of the spindle 14, receives a plate 40 clamped between the front end 15 and the flange 28 by means of tightening the bolts 30, and which has a pilot portion 41 of reduced diameter adapted to be fitted into an appropriate circumferential recess 42 in the front end 15 of the spindle. The second counterbore 38 is adapted to receive a driving plate 44 of somewhat smaller diameter than the counterbore 38 and which is drivingly connected to the outer housing 26 by a plurality of springs 45 (FIG. 4) which are supported in recesses 46 in the driving plate 44 and opposite aligned recesses 48 in the housing 26 to thereby normally tend to bias these two members away from each other. The driving plate 44 is provided centrally with a boss portion 50 adapted for engagement within a corresponding recess 52 in the rear surface 23 of the boring bar 22 to which the driving plate 44 is attached by means of a fastener 54 extending through the boss portion 50 and the recess 52.

The cylindrical bore 32 of the outer housing 26 is adapted to be provided with a first ball bushing 56 which rotatably supports a sleeve 58 having a cylindrical outer surface 60 and cylindrical inner surface 62 eccentrically disposed relative to the outer surface 60. The outer surface 60 of the sleeve 58 is provided with a shoulder 64 at the end of the ball bushing to thereby axially confine the ball bushing 56 and which extends into a flange portion 66 having a circumferentially inclined surface 68 which angularly corresponds to the chamfer 34 of the outer housing 26 and which is held in abutment thereagainst by means of the springs 45. The lower circumferential surface 70 of the flange portion 66 of the sleeve is correspondingly inclined to be in mating contact with a similarly inclined circumferential flange surface 72 provided on a flange portion 74 of the boring bar 22 adjacent the outer end of the housing 26.

Because of the rigid connection of the driving plate 44 to the boring bar 22 by means of the fastener 54, the springs 45 are effective to bias the outer housing 26 and the boring bar 22 in opposite directions so as to maintain contact between the inclined surfaces 34, 68, and 70, 72.

The rear end 23 of the boring bar 22 is supported in the inner bore 62 of the eccentric sleeve 58 within a second ball bushing 76 which is confined against axial movement outwardly by a shoulder 75 defined by the flange portion 74 of the boring bar 22. Thus, the eccentric sleeve 58 is rotatable within the ball bushings 56 and 76 relative to the outer housing 26 and to the boring bar 22, all of which, however, are adapted to rotate as a unit upon rotation of the spindle 14.

Figure 3:
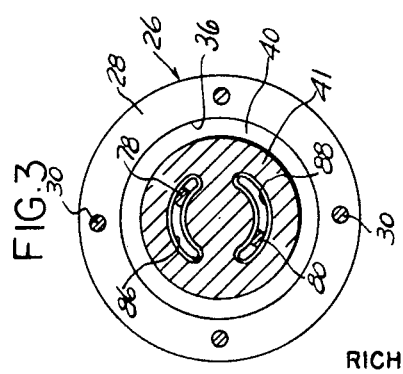
FIG. 3 is a transverse cross section through the boring quill assembly of FIG. 2 as seen along line 3—3 thereof.

To rotate the sleeve 58, the inner end of the sleeve adjacent the inner ends of the ball bushings 56 and 76 is provided with a pair of longitudinally extending parallel tongues 78, 80 disposed in diametrically opposed position and which are integrally formed as a continuation of the body of the sleeve 58. The tongues 78, 80 extend towards the spindle 14 through a pair of radial slots 82, 84 provided in the driving plate 44 and further to another similar pair of aligned radial slots 86, 88 provided in the adjacent spacer plate 40. As shown in FIG. 3, the diametrically opposite radial slots 86, 88 in the spacer plate 40 (and similarly slots 82, 84 in the driving plate 44) are of such radial dimension as to permit radial displacement of the tongues 78 and 80 therein through an angle of about 60° in both directions, thus, the sleeve 58 is rotatable approximately 60° in clockwise and counterclockwise directions.

The longitudinal bore 13 of the spindle 14 is provided at its outer end with a bearing sleeve 90, press fitted therein against rotation, and which outer end abuts against the spacer plate 40. The bearing sleeve 90 receives a ball bushing 92 adapted to rotatively support a coupling member 94. The outer end of the coupling member 94 is provided with a pair of diametrically opposite lateral slots 96, 98 into which the ends of the pair of tongues 78, 80 of the eccentric sleeve 58 extend. The lateral slots 96, 98 are of a width substantially corresponding to the radial width of the tongues to eliminate any radial play between the tongues and the lateral slots to thereby provide a rigid driving connection between the rotatable coupling member 94 and the eccentric sleeve 58. In order to rotate the coupling member 94 and thereby the sleeve 58, the coupling member 94 is provided with an axial bore 100 having internal helical splines 102 cut therein for engagement with the external helical splines 104 of a shaft 106. The shaft 106 is nonrotatably connected to a rod 108 extending axially through the spindle 14 and out of the spindle at the rear end by extension through the spindle drive pulley 16. The rod 108 normally rotates as a unit with the spindle and quill assembly upon rotation of the spindle drive pulley 16 and its outer end is therefore, as seen in FIG. 1, suitably supported within a bearing 110 fitted in the open end of a nonrotatable coupling or yoke member 112. The yoke member 112 is rigidly attached to the end of a piston rod 114 attached to a piston 115 which is reciprocable within the fluid cylinder 18. Referring again to FIG. 5, upon actuation of the fluid cylinder 18 by connecting either fluid conduit 117 or 119 to the source of fluid pressure 121 through operation of the valve 19, the rod 108 is reciprocated by means of the yoke connection 112. Reciprocation of the rod 108 causes a like reciprocation of the spline shaft 106 which is nonrotatably connected thereto to thereby rotate the coupling member 94 due to its helical splined connection thereto. The coupling member 94, in turn, causes rotation of the eccentric sleeve 58 by its connection through the slots 96, 98 with the sleeve tongues 78, 80.

Figure 5:
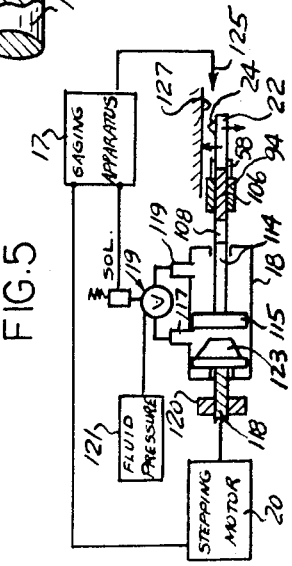
FIG. 5 is a schematic diagram illustrating the manner of operation of the assembly of the present invention.

As further seen in FIGS. 1 and 5, the cylinder 18 contains member 123 to the rear of piston 115 which defines an adjustable limit stop for the rearward movement of piston 115 and which is provided with a piston rod 116 for connection to a rotatable shaft 118 which is connected to the output of the motor 20 for rotation thereby. The rotatable shaft 118 is provided with helical or acme threads and is supported for rotation in an internally threaded bushing or nut 120, which is stationarily supported within a standard 122 extending from a support base 124 which supports both the motor 20 and the cylinder 18. As shown in FIG. 1, the motor 20 is longitudinally slidably supported by means of a bracket 126 provided with a horizontal base portion 128 which is longitudinally bored to receive a guide rod 130 which is stationarily secured at the front to the standard 122 and at the rear to a bracket 132. Thus, actuation of the motor 20 in one direction causes rotation of the threaded shaft 118 within the stationary nut 120, causing longitudinal movement of the shaft 118 through the nut 120. This causes the motor 20, due to its slidable support on the guide rod 130, to be moved forwardly toward the standard 122, as indicated by the alternate position shown in dot-and-dash lines in FIG. 1 and thereby advancing the limit stop 123 within the cylinder 18 towards the piston 115. Actuation of the motor 20 in the other direction, of course, returns the motor 20, the shaft 118 and the limit stop 123 toward their original positions.

The motor 20, which is of the kind known as a stepping motor, and the cylinder 18, except for the addition of the limit piston 123, are conventional off-the-shelf items and need not further be described.

With particular reference to FIG. 5, the present improved boring bar adjusting mechanism operates as follows: the stepping motor 20 is connected to a gaging apparatus 17 which produces electrical signals upon detection of tool wear or irregularities in the bores of the workpiece by means of a sensor or the like indicated by the arrow 125 adapted to scan the surface 127 of a workpiece worked on by the cutting tool 24. The signals are transferred to the motor to start the latter to rotate the shaft 118 in small increments in clockwise or counterclockwise direction as required to thereby advance or retract the limit stop 123 within the cylinder 18. The incorporation of a gaging apparatus of this type in machine tools of this kind is well known in the art and is therefore not deemed necessary to be described in any detail. Substantially simultaneously to actuation of the motor 20 or shortly thereafter the fluid cylinder 18 is actuated by operation of the solenoid-actuated valve 19 which is connected to the gaging apparatus 17 to be controlled thereby. In order to retract the cutting tool 24 from the work surface 127 the valve 19 functions to connect the conduit 117 to the rear of the piston 115 with the source of fluid pressure 121 to thereby move the piston forwardly, that is, to the right in FIGS. 1 and 5. To extend the cutting tool 24 toward the work surface 127, the valve 19 connects the conduit 119 to the front of the piston 115 to move the piston 115 to the left in FIGS. 1 and 5. This movement is transferred by the piston rod 114 and yoke connection 112 to the rod 108 which thus is moved longitudinally through the spindle 14 in predetermined increments to cause longitudinal movement of the spline shaft 106 to advance through the rotatable coupling member 94 to thereby rotate the latter. Rotation of the coupling member 94 within the ball bushing 92 causes the eccentric sleeve 58 to be rotated by means of the slot and tongue connection between the two members through an angular distance limited by the radial dimension of the radial slots 82, 84 in the driving plate 44 and slots 86 and 88 in the spacer plate 40. Due to the eccentricity of the sleeve 58, the boring bar 22 and thus the cutting tool 24 will be retracted away from the work surface 127 along a line normal to the work surface, thereby eliminating the hitherto practiced arrangement of angularly eccentrically rotating the cutting bar itself towards or away from the work surface which is undesirable because it causes drawback marks in the work surface.

Simultaneously, as the piston 115 is moved forwardly to retract the cutting tool 24 from the work surface 127, the limit stop 123 is advanced in predetermined increments by actuation of the stepping motor 20 as described above to limit the return movement of the piston 115 in accordance with the desired feed-in of the cutting tool 24 into the work surface 127.

The creation of fluid pressure in front of the piston 115 causes the piston to be moved towards the rear of the cylinder 18 to thereby longitudinally retract the rod 108 and helically splined shaft 106 which causes rotation of the coupling member 94 and subsequent rotation of the eccentric sleeve 58 in the other direction to move the boring bar and thus the cutting tool 24 in the other direction towards the work surface 127. Regardless of the fluid pressure through conduit 119 rearward movement of the piston 115 is limited by abutment against the advanced limit stop 123. The stepping motor 20 is operable to advance or retract the limit stop 123 within the cylinder 18 in small increments to thereby precisely locate the return of the piston 115 which determines the degree of infeed adjustment of the cutting tool 24 relative to the work surface 127 in correspondence with the degree of wear of the cutting tool.

Thus the actuation of the fluid cylinder 18 provides a rough adjustment of the cutting tool 24 whereas fine precision adjustment is accomplished through actuation of the stepping motor 20.

It will be understood that the adjustment of the boring bar 22 as above described can be made without stopping rotation of the spindle 14, which drives the boring quill assembly 10 through its flange and bolt connection 28, 30.

The boring bar 22 of the present improved structure is sufficiently supported throughout the intended range of adjustment by the pair of ball bushings 56, 76 retaining the eccentric sleeve 58 in a position separate from the boring bar 22 so as not to transfer any reaction forces of the work against the boring bar into the adjusting mechanism, and thus thereby always maintaining the initial setup of the cutting tool 24 relative to the work surface in any adjusted position.

By the present improved arrangement, the cutting tool 24 is advanced or retracted from the work surface in a straight line normal to the work surface and permits extremely accurate microfine adjustment of the boring bar during operation of the spindle 14, which, when once made, does not require the tightening-up of any associated parts in the spindle or quill assembly. In the quill assembly, the springs 45 maintain the parts in their proper position with sufficient stability to permit the cutting operation to be carried out and at the same time also permitting the required radial adjustment of the boring bar.

In conclusion, the present invention may be briefly described as comprising essentially a rotatable quill assembly, a boring bar mounted within the quill assembly and movable eccentrically relative to the quill assembly to radially shift a cutting tool between a fully extended fully retracted position, and an actuator mechanism for moving the boring bar to any of several positions between the fully extended and retracted positions. The invention further contemplates an actuator mechanism automatically causing the boring bar to shift the cutting tool and to retract the cutting tool when conditions require. The invention includes the stepping motor and the stop member which provide adjustment of the cutting tool to compensate for wear in increments heretofore difficult to obtain.

Having thus described our invention, we claim:

1. Means for radially adjusting a rotatably mounted cutting tool comprising:
    a fluid cylinder having a piston being linearly movable and means connecting said piston and said cutting tool to produce radially inward adjustment of the cutting tool upon movement of said piston in one direction and radially outward adjustment of said cutting tool upon movement of said piston in opposite direction; and
    an automatically adjustable stop member mounted within said fluid cylinder and operable to abut said piston to adjustably limit movement of said piston in one direction whereby to adjustably limit the radial adjustment of said cutting tool.

2. The invention as defined in claim 1 wherein said rotatably mounted cutting tool is operable to perform a cutting operation on a workpiece and including means sensing the effect of said cutting tool on said workpiece and moving said stop member to a position dependent upon the deviation of this effect from a predetermined standard.

3. The invention as defined in claim 1 and in which said cutting tool is operable to perform a cutting operation on a workpiece and including sensing means operable to sense the deviation in the cutting operation performed on said workpiece from a predetermined standard, a motor connected with said stop member and being linearly movable so as to move said stop member linearly when said motor is actuated and means connecting said sensing means and said motor to actuate said motor upon said sensing means sensing a deviation in said workpiece.

4. In combination with a boring machine having a spindle, a boring quill secured to said spindle for rotation therewith, a boring bar having a cutting tool adapted for working upon a work surface, said boring bar being adjustably secured within said boring quill along an axis eccentric in relation relative to the central axis of said boring quill and said spindle, means effecting automatic radial adjustment of said boring bar in relation to said work surface around said central axis, said means comprising:
    a gaging apparatus,
    a fluid cylinder operably connected to said boring quill,
    said fluid cylinder having a fluid chamber containing a piston reciprocable therein,
    a first conduit adapted to selectively connect said fluid chamber behind said piston with a source of fluid pressure,
    a second conduit adapted to selectively connect said fluid chamber forwardly of said piston with said source of fluid pressure,
    means interposed between said source of fluid pressure and said first and second conduit responsive to signals received from said gaging apparatus to selectively connect said source of fluid pressure with first or said second conduit; and
    an adjustable stop member disposed within said fluid cylinder chamber and operable to abut said piston to limit movement of said piston in one direction, and
    means responsive to signals from said gaging apparatus to move said stop member within said fluid cylinder.

5. In the combination as defined in claim 4, said piston being operable upon actuation of said fluid cylinder to effect adjustment of said boring bar relative to said work surface to retract said cutting tool from said work surface when moved in a first direction by connection of said source of fluid pressure with said first conduit and to feed said cutting tool towards said work surface when moved in an opposite direction by connection of said source of fluid pressure with said second conduit, said stop member being effective to limit movement of said piston in said second direction.

6. In the combination as defined in claim 5, said signal responsive means comprising an electric motor connected with said stop member and actuated by said signals received from said gaging apparatus.

7. In the combination as defined in claim 6, said stop member being connected to a screw shaft adapted for rotation by said motor, said screw shaft being supported in a stationary nut member so that upon rotation of said screw shaft by said motor said screw shaft will be linearly advanced through said nut member to thereby reciprocate said stop member.

8. In the combination as defined in claim 4, said means interposed between said source of fluid pressure and said first and second conduit comprising a normally closed valve, a solenoid for operation of said valve, said solenoid being connected to said gaging apparatus and responsive to signals received therefrom 9. The invention as defined in claim 4 and in which said boring quill comprises a housing, a first bushing retained within said housing, a second bushing retained around said boring bar, a rotatable eccentric sleeve member disposed within said bushings and operable upon rotation to move said boring bar to a new radial position.

10. The invention as defined in claim 5 wherein said stop member is disposed within said fluid chamber behind said piston; and said stop member is effective to limit movement of said piston by abutment of said piston with said stop member.

* * * * *

UNITED STATES PATENT OFFICE
CERTIFICATE OF CORRECTION

Patent No. 3,640,633        Dated Feb. 8, 1972

Inventor(s)    Richard C. Gersch

It is certified that error appears in the above-identified patent and that said Letters Patent are hereby corrected as shown below:

Column 2, line 23, after "14" insert --supported by housing 11--

Column 2, line 25, delete "supported by housing 11"

Signed and sealed this 4th day of July 1972.

(SEAL)
Attest:

EDWARD M. FLETCHER, JR.         ROBERT GOTTSCHALK
Attesting Officer               Commissioner of Patents